US012749622B2

(12) United States Patent
Seong et al.

(10) Patent No.: US 12,749,622 B2
(45) Date of Patent: Sep. 29, 2026

(54) MULTILAYER CERAMIC CAPACITOR AND METHOD OF MANUFACTURING THE SAME

(71) Applicant: SAMSUNG ELECTRO-MECHANICS CO., LTD., Suwon-si (KR)

(72) Inventors: Kwang Dong Seong, Suwon-si (KR); Youngah Song, Suwon-si (KR); Bonggyu Choi, Suwon-si (KR); Dokyeong Lee, Suwon-si (KR); Jaehoon Bang, Suwon-si (KR); Wansik Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 260 days.

(21) Appl. No.: 18/613,791

(22) Filed: Mar. 22, 2024

(65) Prior Publication Data

US 2025/0182965 A1 Jun. 5, 2025

(30) Foreign Application Priority Data

Dec. 1, 2023 (KR) ........................ 10-2023-0172459

(51) Int. Cl.
*H01G 4/008* (2006.01)
*H01G 4/12* (2006.01)
*H01G 4/30* (2006.01)

(52) U.S. Cl.
CPC ............... *H01G 4/008* (2013.01); *H01G 4/12* (2013.01); *H01G 4/30* (2013.01)

(58) Field of Classification Search
CPC ............. H01G 4/008; H01G 4/12; H01G 4/30
See application file for complete search history.

(56) References Cited

U.S. PATENT DOCUMENTS

2009/0323253 A1* 12/2009 Kobayashi ............. H01G 4/005 427/79
2011/0075318 A1* 3/2011 Suzuki ..................... H01C 7/18 156/89.16

(Continued)

FOREIGN PATENT DOCUMENTS

| | | |
|---|---|---|
| JP | 2023-093062 A | 7/2023 |
| JP | 2023-093942 A | 7/2023 |
| KR | 10-2023-0102797 A | 7/2023 |

*Primary Examiner* — Michael P Mcfadden
(74) *Attorney, Agent, or Firm* — Morgan, Lewis & Bockius LLP

(57) ABSTRACT

A multilayer ceramic capacitor includes a capacitor body that includes an active portion including dielectric layers and internal electrode layers that are alternately disposed, and cover portions including dielectric layers disposed on upper and lower surfaces of the active portion in the thickness direction, and external electrodes disposed on the capacitor body. The external electrodes include inner layers disposed on the active portion to be electrically coupled to at least one of the internal electrode layers, and outer layers disposed on the inner layers and the cover portions to cover the inner layers. The inner layers include a conductive metal in an amount of 95 atom % to 100 atom % based on the total amount of the inner layers. The outer layers include a conductive metal, and glass including aluminum oxide and silicon dioxide. The thickness of the inner layers is within a range from 1 μm to 3 μm.

21 Claims, 11 Drawing Sheets

(56) References Cited

U.S. PATENT DOCUMENTS

| | | | | |
|---|---|---|---|---|
| 2015/0064576 | A1* | 3/2015 | Aitken | C03C 3/127 65/33.9 |
| 2017/0244023 | A1* | 8/2017 | Kim | H10N 30/872 |
| 2018/0068788 | A1* | 3/2018 | Kobayashi | C23C 18/1279 |
| 2018/0182552 | A1* | 6/2018 | Sawada | H01G 4/232 |
| 2018/0247766 | A1* | 8/2018 | Fukuda | H01G 4/248 |
| 2019/0355518 | A1* | 11/2019 | Harada | H01G 4/30 |
| 2022/0013291 | A1* | 1/2022 | Nishisaka | H01G 4/1227 |
| 2022/0208464 | A1* | 6/2022 | Lee | H01G 4/012 |
| 2023/0197339 | A1 | 6/2023 | Kitahara et al. | |
| 2023/0207214 | A1 | 6/2023 | Doi | |
| 2023/0215629 | A1 | 7/2023 | Oh et al. | |

* cited by examiner

MULTILAYER CERAMIC CAPACITOR AND METHOD OF MANUFACTURING THE SAME

CROSS-REFERENCE TO RELATED APPLICATION

This application claims priority to and the benefit of Korean Patent Application No. 10-2023-0172459 filed in the Korean Intellectual Property Office on Dec. 1, 2023, the entire contents of which are incorporated herein by reference.

BACKGROUND

(a) Technical Field

The present disclosure relates to a multilayer ceramic capacitor and a method of manufacturing the same.

(b) Description of the Related Art

Electronic components using ceramic materials include capacitors, inductors, piezoelectric devices, varistors, thermistors, and so on. Among these ceramic electronic components, multilayer ceramic capacitors (MLCCs) have the advantage that they are small, the high capacitance of them is guaranteed, and it is easy to mount them, and thus can be used in a variety of electronic devices.

For example, multilayer ceramic capacitors may be used in chip-like capacitors that are mounted on substrates of various electronic products such as imaging devices, for example, liquid crystal displays (LCDs), plasma display panels (PDPs), and organic light-emitting diodes (OLEDs), computers, personal portable terminals, and smart phones so as to serve to charge or discharge.

Recently, with microminiaturization of MLCCs and an increase in the capacitance of MLCCs, thinning of internal electrode and dielectric layers and thinning of external electrodes are in progress. As external electrodes are thinned, it is required to form stabler external electrodes to protect MLCCs from external moisture.

SUMMARY

The present disclosure attempts to provide a multilayer ceramic capacitor which is excellent in corrosion resistance and moisture resistance reliability as well as in the connectivity of internal electrodes and external electrodes.

Also, the present disclosure attempts to provide a method of manufacturing the multilayer ceramic capacitor.

An embodiment provides a multilayer ceramic capacitor which includes a capacitor body that includes dielectric layers and internal electrode layers, the capacitor body includes (i) an active portion in which the dielectric layers and the internal electrode layers are alternately disposed, and (ii) a cover portion in which the dielectric layers are disposed on surfaces of the active portion opposing each other in a thickness direction, and external electrodes that are disposed on an outside of the capacitor body, each of the external electrodes includes (i) an inner layer that is disposed on the active portion on a cross-section of the capacitor body so as to be electrically coupled to at least one of the internal electrode layers, and (ii) an outer layer that is disposed on the inner layer and the cover portion so as to cover the inner layer, the inner layer includes a conductive metal in an amount of 95 atom % to 100 atom % based on a total amount of elements in the inner layer, and the outer layer includes the conductive metal, and glass including aluminum oxide ($Al_2O_3$) and silicon dioxide ($SiO_2$), wherein a thickness of the inner layer is in a range of from 1 μm to 3 μm.

Another embodiment provides a multilayer ceramic capacitor which includes a capacitor body that includes dielectric layers and internal electrode layers, the capacitor body includes (i) an active portion in which the dielectric layers and the internal electrode layers are alternately disposed, and (ii) a cover portion in which the dielectric layers are disposed on surfaces of the active portion opposing each other in a thickness direction, and external electrodes that are disposed on an outside of the capacitor body, each of the external electrodes includes (i) an inner layer that is disposed on the active portion on a cross-section of the capacitor body so as to be electrically coupled to at least one of the internal electrode layers, and (ii) an outer layer that is disposed on the inner layer and the cover portion so as to cover the inner layer, the inner layer include a conductive metal in an amount of 95 atom % to 100 atom % based on a total amount of elements in the inner layer, the outer layer includes a conductive metal, and glass including aluminum oxide ($Al_2O_3$) and silicon dioxide ($SiO_2$), the outer layer includes an interface region R1 defined as a region from a boundary between the inner layer and the outer layer to a point in a range of from 5% to 15% of a total thickness of the external electrodes in a length direction, and the glass is included in the interface region R1 in an amount of 50 mol % to 100 mol % based on a total amount of the glass of the outer layer.

The conductive metal that is included in the inner layer and the outer layer may comprise copper (Cu), nickel (Ni), silver (Ag), palladium (Pd), gold (Au), platinum (Pt), tin (Sn), tungsten (W), titanium (Ti), lead (Pb), an alloy thereof, or a combination thereof.

The conductive metal that is included in the inner layer and the outer layer may comprise nanoparticles with an average size of 20 nm to 200 nm.

The inner layer may further comprise the glass including aluminum oxide ($Al_2O_3$) and silicon dioxide ($SiO_2$), and the glass of the inner layer may be included in an amount of 0.1 mol % to 5 mol % based on a total amount of components of the inner layer.

The outer layer may include an interface regions R2 defined as a region from a boundary between the cover portion and the outer layer to a point in a range of from 5% to 15% of a total thickness of the external electrodes along a longest curvature radii of the external electrodes, and the glass of the outer layer may be included in the interface region R2 in an amount of 70 mol % to 100 mol % based on a total amount of the glass of the outer layers.

At least one of the inner layer and the internal electrode layers may include a Cu—Ni alloy.

Aluminum oxide ($Al_2O_3$) may be included in an amount of 10 mol % to 20 mol % based on a total amount of the glass of the outer layer.

Silicon dioxide ($SiO_2$) may be included in an amount of 8 mol % to 15 mol % based on a total amount of the glass of the outer layer.

The glass of the outer layer may further include lithium oxide ($Li_2O$), sodium oxide ($Na_2O$), iron(III) oxide ($Fe_2O_3$), zinc oxide (ZnO), barium oxide (BaO), calcium oxide (CaO), boron trioxide ($B_2O_3$), tin (IV) oxide ($SnO_2$), or a combination thereof.

The glass of the outer layer may further include iron(III) oxide ($Fe_2O_3$) and zinc oxide (ZnO), and iron(III) oxide ($Fe_2O_3$) may be included in an amount of 1 mol % to 3 mol % based on a total amount of the glass of the outer layer, and zinc oxide (ZnO) may be included in an amount of 5 mol % to 10 mol % based on a total amount of the glass of the outer layer.

Yet another embodiment provides a method of manufacturing the multilayer ceramic capacitor, the method includes forming a metal particle film by applying metal-organic decomposition (MOD) ink to one surface of the capacitor body and reducing the metal-organic decomposition (MOD) ink; applying a paste including the conductive metal and the glass to one surface of the capacitor body on which the metal particle film is formed; and sintering the paste to form the external electrodes, each of the external electrodes includes the inner layer, which is formed from the metal particle film, and the outer layer, which is formed from the paste.

The metal-organic decomposition (MOD) ink may include a conductive metal formate, an amine compound, a binder, and a solvent.

The metal-organic decomposition (MOD) ink may be applied to a thickness of 50 μm to 400 μm.

The reducing may be performed at a temperature of 170° C. to 300° C. for 30 minutes to 3 hours.

The metal particle film may include metal nanoparticles with an average size of 20 nm to 200 nm.

Aluminum oxide ($Al_2O_3$) may be included in an amount of 10 mol % to 20 mol % based on a total amount of the glass included in the paste.

Silicon dioxide ($SiO_2$) may be included in an amount of 8 mol % to 15 mol % based on a total amount of the glass included in the paste.

A multilayer ceramic capacitor according to an embodiment may include external electrodes excellent in the contact property with respect to internal electrodes, corrosion resistance, and moisture resistance reliability, such that the reliability is improved.

DETAILED DESCRIPTION

Figure 1:
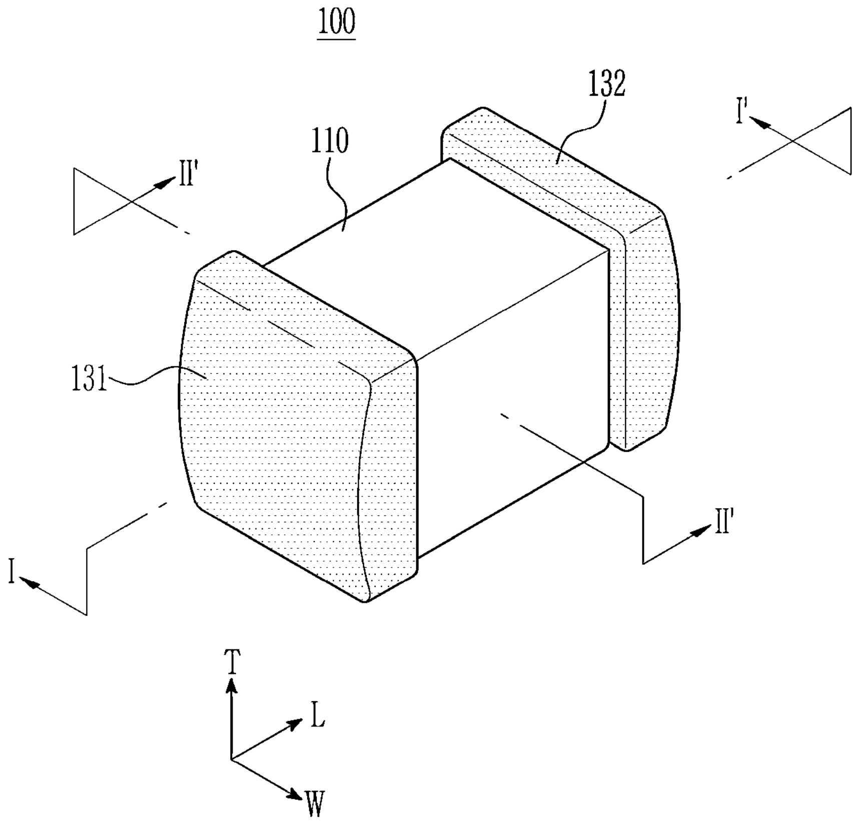
FIG. 1 is a perspective view illustrating a multilayer ceramic capacitor according to an embodiment.

Hereinafter, embodiments of the present disclosure will be described in detail with reference to the accompanying drawings such that those skilled in the art can easily implement them. The drawings and description are to be regarded as illustrative in nature and not restrictive. Like reference numerals designate like elements throughout the specification. Further, some constituent elements in the drawing may be exaggerated, omitted, or schematically illustrated, and a size of each constituent element does not reflect the actual size entirely.

The accompanying drawings are provided for helping to easily understand embodiments disclosed in the present specification, and the technical spirit disclosed in the present specification is not limited by the accompanying drawings, and it will be appreciated that the present disclosure includes all of the modifications, equivalent matters, and substitutes included in the spirit and the technical scope of the present disclosure.

Terms including an ordinary number, such as first and second, are used for describing various constituent elements, but the constituent elements are not limited by the terms. The terms are used only to discriminate one constituent element from another constituent element.

Further, it will be understood that when an element such as a layer, film, region, or substrate is referred to as being "on" another element, it can be directly on the other element or intervening elements may also be present. In contrast, when an element is referred to as being "directly on" another element, there are no intervening elements present. Further, when an element is "on" a reference portion, the element is located above or below the reference portion, and it does not necessarily mean that the element is located "above" or "on" in a direction opposite to gravity.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. Therefore, unless explicitly described to the contrary, the word "comprise", and variations such as "comprises" or "comprising", will be understood to imply the inclusion of stated elements but not the exclusion of any other elements.

Further, in the entire specification, when it is referred to as "on a plane", it means when a target part is viewed from above, and when it is referred to as "on a cross-section", it means when the cross-section obtained by cutting a target part vertically is viewed from the side.

Further, throughout the specification, when it is referred to as "connected", this does not only mean that two or more constituent elements are directly connected, but may mean that two or more constituent elements are indirectly connected through another constituent element, are physically connected, electrically connected, or are integrated even though two or more constituent elements are referred as different names depending on a location and a function.

Hereinafter, a multilayer ceramic capacitor according to an embodiment will be described with reference to FIGS. 1 to 4.

Figure 2:
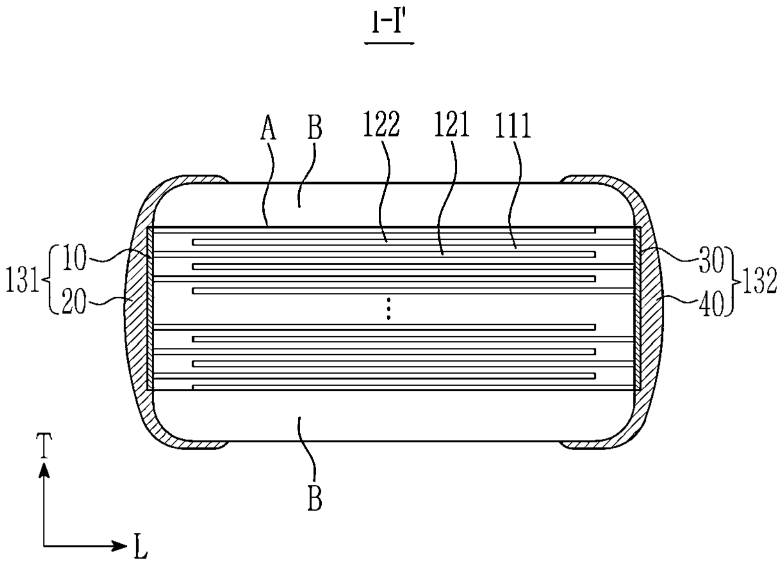
FIG. 2 is a cross-sectional view of the multilayer ceramic capacitor taken along line I-I' of FIG. 1.
Figure 3:
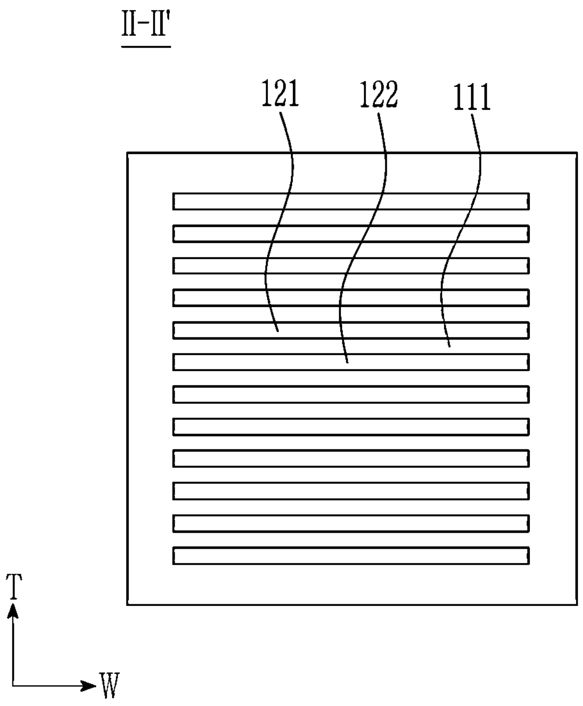
FIG. 3 is a cross-sectional view of the multilayer ceramic capacitor taken along line II-II' of FIG. 1.
Figure 4:
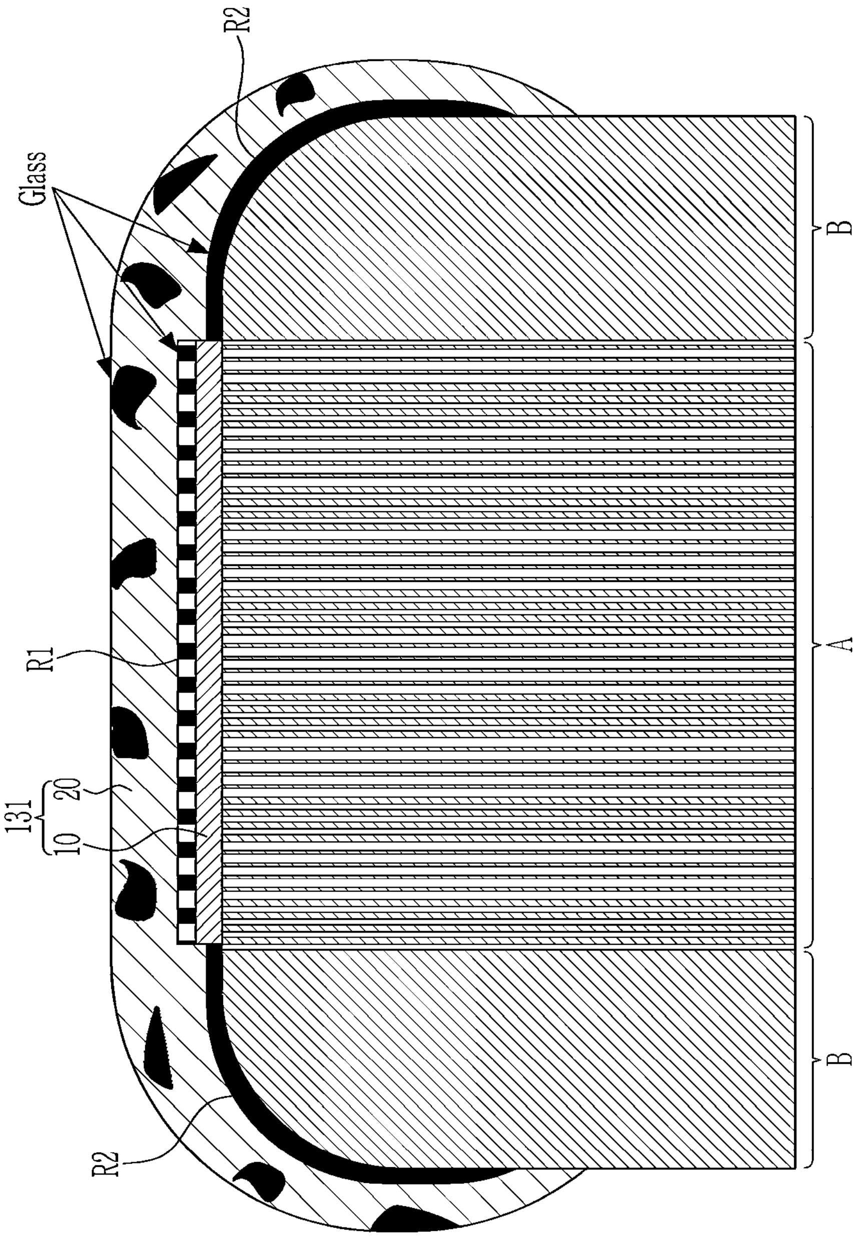
FIG. 4 is a schematic diagram illustrating an external electrode of the multilayer ceramic capacitor according to the embodiment.

FIG. 1 is a perspective view illustrating a multilayer ceramic capacitor according to an embodiment, FIG. 2 is a cross-sectional view of the multilayer ceramic capacitor taken along line I-I' of FIG. 1, FIG. 3 is a cross-sectional view of the multilayer ceramic capacitor taken along line II-II' of FIG. 1, and FIG. 4 is a schematic diagram illustrating an external electrode of the multilayer ceramic capacitor according to the embodiment.

The L axis, the W axis, and the T axis shown in FIGS. 1 to 3 represent the length direction, width direction, and thickness direction of the capacitor body 110, respectively. Here, the thickness direction (T-axis direction) may be a direction perpendicular to wide surfaces (main surfaces) of sheet-shaped constituent elements, and may be used, for example, as the same concept as the stacking direction in which dielectric layers 111 are stacked. The length direction (L-axis direction) may be a direction extending in parallel with the wide surfaces (main surfaces) of the sheet-shaped constituent elements and be a direction appropriately perpendicular to the thickness direction (T-axis direction), and may be, for example, a direction in which a first external electrode 131 and a second external electrode 132 are disposed on both sides. The width direction (W-axis direction) may be a direction extending in parallel with the wide surfaces (main surfaces) of the sheet-shaped constituent elements and be a direction appropriately perpendicular to the thickness direction (T-axis direction) and the length direction (L-axis direction), and the lengths of the sheet-shaped constituent elements in the length direction (L-axis direction) may be longer than their lengths in the width direction (W-axis direction).

Referring to FIGS. 1 to 4, a multilayer ceramic capacitor 100 according to an embodiment includes a capacitor body 110, and external electrodes 131 and 132 that are disposed on the outside of the capacitor body 110. The external electrodes 131 and 132 may include the first external electrode 131 and the second external electrode 132 that are disposed on both ends of the capacitor body 110 facing each other in the length direction (L-axis direction).

The capacitor body 110 may have, for example, an approximate hexahedral shape.

For ease of explanation of the embodiment, in the capacitor body 110, two surfaces facing each other in the thickness direction (T-axis direction) are defined as a first surface and a second surface, and two surfaces that are coupled to the first surface and the second surface and face each other in the length direction (L-axis direction) are defined as a third surface and a fourth surface, and two surfaces that are coupled to the first surface and the second surface, are coupled to the third surface and the fourth surface, and face each other in the width direction (W-axis direction) are defined as a fifth surface and a sixth surface.

As an example, the first surface which is the lower surface may be a surface oriented to the mounting direction. Further, the first surface to the sixth surface may be flat; however, the embodiment is not limited thereto. For example, the first surface to the sixth surface may be curved surfaces with convex center portions, and the border of each surface, i.e., the edge may be rounded.

The shape and dimensions of the capacitor body 110 and the number of dielectric layers 111 that are stacked are not limited to those shown in the drawings of the present embodiment.

The capacitor body 110 includes a plurality of dielectric layers 111 and internal electrode layers 121 and 122. Specifically, the capacitor body 110 includes the plurality of dielectric layers 111, and first internal electrode layers 121 and second internal electrode layers 122 that are alternately disposed in the thickness direction (T-axis direction) with the dielectric layers 111 interposed therebetween.

At this time, the boundary between the adjacent dielectric layers 111 of the capacitor body 110 may be integrated to the extent that it is difficult to check without using a scanning electron microscope (SEM).

The capacitor body 110 may include an active portion A where the dielectric layers 111 and the internal electrode layers 121 and 122 are alternately disposed. The active portion A is a portion that contributes to the formation of the capacitance of the multilayer ceramic capacitor 100. As an example, the active portion A may be the region where the first internal electrode layers 121 and the second internal electrode layers 122 that are stacked along the thickness direction (T-axis direction) overlap.

Further, the capacitor body 110 may further include cover portions B and side margin portions.

The cover portions B are margin portions in the thickness direction, and may be disposed on the first surface side and second surface side of the active portion A in the thickness direction (T-axis direction). These cover portions B may be a single dielectric layer 111 or two or more dielectric layers 111 stacked on an upper side and a lower side of the active portion A, respectively.

The side margin portions are margin portions in the width direction, and may be disposed on the fifth surface side and sixth surface side of the active portion A in the width direction (W-axis direction), respectively. These side margin portions may be formed by stacking dielectric green sheets with conductive paste layers for forming internal electrode layers and firing them. When the conductive paste layers are formed on the surfaces of the dielectric green sheets, the conductive paste may be applied only to some portions of the surfaces of the dielectric green sheets and may not be applied to both side surfaces of each of the dielectric green sheets.

The cover portions B and the side margin portions serve to prevent damage to the first internal electrode layers 121 and the second internal electrode layers 122 by physical or chemical stress.

The dielectric layers 111 and the internal electrode layers 121 and 122 will be described below in detail.

External Electrodes

Referring to FIGS. 2 and 4, the external electrodes 131 and 132, i.e. the first external electrode 131 and the second external electrode 132 may receive voltages of different polarities, and may be electrically coupled to the exposed portions of the first internal electrode layers 121 and the second internal electrode layers 122, respectively.

According to the above configuration, when a predetermined voltage is applied between the first external electrode 131 and the second external electrode 132, charge is accumulated between the first internal electrode layers 121 and the second internal electrode layers 122 facing each other. At this time, the capacitance of the multilayer ceramic capacitor 100 becomes proportional to the overlapped area of the first internal electrode layers 121 and the second internal electrode layers 122 overlapping each other along the T-axis direction in the active portion.

The first external electrode 131 and the second external electrode 132 may be disposed on the third and fourth surfaces of the capacitor body 110, respectively, and may include first and second connection portions, respectively, that are coupled to the first internal electrode layers 121 and the second internal electrode layers 122, respectively, and include first and second band portions, respectively, that are disposed at the edges where the third and fourth surfaces of the capacitor body 110 meet either the first and second surfaces or the fifth and sixth surfaces.

The first and second band portions may extend from the first and second connection portions to some portions of either the first and second surfaces or fifth and sixth surfaces of the capacitor body 110. The first and second band portions may serve to improve the adhesion strength of the first external electrode 131 and the second external electrode 132.

The external electrodes 131 and 132 according to the embodiment includes inner layers 10 and 30 that are disposed on the active portion A on a cross-section of the capacitor body 110 so as to be electrically coupled to at least one of the internal electrode layers 121 and 122, and outer layers 20 and 40 that are disposed on the inner layers 10 and 30 and the cover portions B so as to cover the inner layers 10 and 30. Specifically, the first external electrode 131 includes the first inner layer 10 disposed on the active portion A on a cross-section of the capacitor body 110 so as to be electrically coupled to the first internal electrode layers 121, and the first outer layer 20 disposed on the first inner layer 10 and the cover portions B so as to cover the first inner layer 10. Further, the second external electrode 132 includes the second inner layer 30 disposed on the active portion A on a cross-section of the capacitor body 110 so as to be electrically coupled to the second internal electrode layer 122, and the second outer layer 40 disposed on the second inner layer 30 and the cover portions B so as to cover the second inner layer 30.

The inner layers 10 and 30 include a conductive metal. The inner layers 10 and 30 include the conductive metal in an amount of 95 atom % or more, i.e., in an amount of 95 atom % to 100 atom % based on a total amount of elements (e.g., conductive metal and oxygen) in the inner layers. The amount of the conductive metal may be determined by scanning electron microscope-energy dispersive spectroscopy (SEM-EDS) analysis. Other methods and/or tools appreciated by one of ordinary skill in the art, even if not described in the present disclosure, may also be used.

The outer layers 20 and 40 include a conductive metal and glass, and the glass includes aluminum oxide ($Al_2O_3$) and silicon dioxide ($SiO_2$). Since the glass including aluminum oxide ($Al_2O_3$) and silicon dioxide ($SiO_2$) is included in the outer layers 20 and 40, it is possible to obtain the external electrodes excellent in the moisture resistance to external moisture as well as in the corrosion resistance to a plating solution.

The glass including aluminum oxide ($Al_2O_3$) and silicon dioxide ($SiO_2$) may be described as Al—Si glass. By the way, Al—Si-based glass is characterized by poor wettability with respect to the conductive metal. Therefore, during a sintering process, the glass inside the conductive metal may be pushed out of the electrodes, resulting in glass beading in which the glass coalesces, or a problem that the glass spreads under the active portion of the capacitor body which is the portion below the external electrodes. In other words, the wettability of the Al—Si-based glass with respect to the conductive metal may decrease, which may cause the glass not to be uniformly positioned and cause a large amount of glass to be positioned near the active portion of the capacitor body which is a ceramic block having a relatively higher affinity for the glass. When the glass which is a nonconductor spreads under the active portion, a problem may occur in the connectivity between the internal electrode layers and external electrodes of the multilayer ceramic capacitor. Accordingly, it is difficult to secure conductivity in the electrodes, and as a result, a decrease in capacitance may eventually occur.

According to the embodiment, the external electrodes 131 and 132 include the inner layers 10 and 30 including 95 atom % or more of the conductive metal, and the inner layers 10 and 30 are disposed on the active portion A of the capacitor body 110. Therefore, it is possible to prevent the glass from spreading near the active portion, which improves the contact property with respect to the internal electrode layers, thereby implementing high capacitance. Accordingly, it is possible to obtain the external electrodes excellent in corrosion resistance and moisture resistance as well as in the contact property with respect to the internal electrode layers. As a result, the reliability of the multilayer ceramic capacitor can be improved.

The thickness of the inner layers 10 and 30 may be in a range from 1 μm to 3 μm, for example, in a range from 1.1 μm to 2.9 μm or a range from 1.2 μm to 2.8 μm. When the thickness of the inner layers 10 and 30 is in the above-mentioned range, it is possible to suppress the phenomenon in which the glass of the outer layers 20 and 40 that are positioned thereon spreads near the active portion A, and accordingly, it is possible to obtain the external electrodes excellent in the corrosion resistance and the moisture resistance as well as in the contact property with respect to the internal electrode layers.

The thickness of the inner layers 10 and 30 may be obtained by SEM analysis. Specifically, a cross section sample having a surface along the L-axis direction and the T-axis direction (hereinafter, referred to as a LT surface) may be obtained such that the external electrodes can be observed, by loading the multilayer ceramic capacitor 100 on a tape such that its LT surface faces up, putting it in an epoxy mixture, curing it, and polishing the LT surface of the capacitor body 110 half way in the W-axis direction. Subsequently, SEM images of the obtained cross section sample may be obtained with a scanning electron microscope (SEM) such that the entire portions of the capacitor body and the external electrode disposed on one side are shown and the center and corner portions of the external electrode are shown. The SEM images may be obtained at 20 kV and 0.2 nA with the SEM, for example, a TESCAN Vega3.

From the obtained SEM images of the cross section sample, the thicknesses of the inner layers 10 and 30 disposed between the active portion A of the capacitor body 110 and the outer layers 20 and 40 of the external electrodes 131 and 132 may be measured. The thickness of each of the inner layers 10 and 30 may be obtained by setting the center point of the corresponding inner layer 10 or 30 in the width direction (W-axis direction) as a reference point and calculating the arithmetic average of the thicknesses at 10 points at predetermined intervals from the reference point. The intervals between the 10 points may be adjusted according to the scale of the scanning electron microscope (SEM) image, and may be, for example, an interval of 1 μm to 100 μm, 1 μm to 50 μm, or 1 μm to 10 μm. In this case, all 10 points should be located within the corresponding inner layer 10 or 30, and when all 10 points are not located within the corresponding inner layer 10 or 30, the position of the reference point may be changed or the interval of 10 points may be adjusted.

The outer layers 20 and 40 may include interface regions (hereinafter, denoted by R1) that are defined as the regions from the boundaries between the inner layers 10 and 30 and the outer layers 20 and 40 to the points within ranges from 5% to 15% of the total thicknesses of the external electrodes 131 and 132 in the length direction (L-axis direction).

The glass which is included in the outer layers 20 and 40 may be included in the interface regions R1 in an amount of 50 mol % to 100 mol % based on the total amounts of the glass of the outer layers 20 and 40, for example, in an amount of 55 mol % to 99 mol %, 60 mol % to 98 mol %, or 70 mol % to 95 mol %. When the contents of the glass in the interface regions R1 are within the above-mentioned range, since the contact property between the external electrodes and the internal electrode layers are improved, it is possible to implement high capacitance, and since the corrosion resistance and the moisture resistance are improved, it is possible to improve the reliability of the multilayer ceramic capacitor.

The contents of the glass in the interface regions R1 and R2, described below, of the outer layers 20 and 40 may be obtained by scanning electron microscope-energy dispersive spectroscopy (SEM-EDS) analysis. Specifically, a cross section sample may be obtained from the multilayer ceramic capacitor 100 by the above-mentioned method, and then a SEM image of the cross section sample may be obtained with a scanning electron microscope (SEM) such that the entire portions of the capacitor body and the external electrode disposed on one side are shown and the center and corner portions of the external electrode are shown. SEM images may be measured at 20 kV and 0.2 nA with the SEM, for example, a TESCAN Vega3. From the obtained SEM images of the cross section sample, the contents of individual components in the inner layers 10 and 30 and outer layers 20 and 40 of the external electrodes 131 and 132 may be checked by performing energy dispersive spectroscopy (EDS) analysis.

The conductive metal included in the inner layers 10 and 30 and the outer layers 20 and 40 may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, and among them, for example, copper (Cu) may be used.

The conductive metal may include nanoparticles with an average size of 20 nm to 200 nm, such as nanoparticles with an average size of 40 nm to 180 nm.

The inner layers 10 and 30 may further include glass in addition to the conductive metal. The glass may include aluminum oxide ($Al_2O_3$) and silicon dioxide ($SiO_2$). The glass included in the inner layers 10 and 30 may be glass migrating from paste during formation of the outer layers 20 and 40 of the external electrodes 131 and 132.

The glass included in the inner layers 10 and 30 may be included in an amount of 5 mol % or less, for example, 0.1 mol % to 5 mol %, 0.2 mol % to 3 mol %, or 0.5 mol % to 2 mol % based on the total amounts of components of the inner layers 10 and 30.

The outer layers 20 and 40 may include interface regions (hereinafter, denoted by R2) that are defined as the regions from the boundaries between the cover portions B of the capacitor body 110 and the outer layers 20 and 40 of the external electrodes 131 and 132 to the points in ranges from 5% to 15% of the total thicknesses of the external electrodes 131 and 132 along the longest curvature radii of the external electrodes 131 and 132. The interface regions R2 may be disposed in band portions of the capacitor body 110.

The glass included in the outer layers 20 and 40 may be included in the interface regions R2 in an amount 70 mol % to 100 mol %, for example, 75 mol % to 98 mol %, or 80 mol % to 95 mol % based on the total amounts of the glass of the outer layers 20 and 40. When the contents of the glass in the interface regions R2 are within the above-mentioned range, the connectivity between the external electrodes and the internal electrode layers is excellent and the corrosion resistance and the moisture resistance are excellent. Therefore, the reliability of the multilayer ceramic capacitor can be improved.

According to the embodiment, even when the glass excellent in the corrosion resistance, i.e., the corrosion-resistant glass is applied, since the inner layers 10 and 30 including 95 atom % or more of the conductive metal are formed on the active portion A, the contact property with respect to the internal electrode layers is enhanced. Therefore, the conductive metal in the external electrodes can diffuse well into the internal electrode layers 121 and 122 while the nickel in the internal electrode layers 121 and 122 can diffuse well into the external electrodes 131 and 132. Accordingly, the external electrodes 131 and 132, specifically the inner layers 10 and 30, and/or the internal electrode layers 121 and 122 may include a Cu—Ni alloy.

The Cu—Ni alloy may be checked by the above-mentioned method using scanning electron microscope-energy dispersive spectroscopy (SEM-EDS) analysis.

The glass included in the outer layers 20 and 40 includes aluminum oxide ($Al_2O_3$) and silicon dioxide ($SiO_2$).

Aluminum oxide ($Al_2O_3$) may be included in an amount of 10 mol % to 20 mol %, for example, 10 mol % to 15 mol %, or 10.6 mol % to 13.6 mol %, based on the total amount of the glass. Silicon dioxide ($SiO_2$) may be included in an amount of 8 mol % to 15 mol %, for example, 9 mol % to 14 mol %, or 10.1 mol % to 12.6 mol %, based on the total amount of the glass. When the contents of aluminum oxide ($Al_2O_3$) and silicon dioxide ($SiO_2$) are within the above-mentioned ranges, the corrosion resistance to a plating solution is strong. Therefore, it is possible to obtain the external electrodes with improved corrosion resistance and moisture resistance. The amounts of aluminum oxide ($Al_2O_3$) and silicon dioxide ($SiO_2$) may each be determined by scanning electron microscope-energy dispersive spectroscopy (SEM-EDS) analysis. Other methods and/or tools appreciated by one of ordinary skill in the art, even if not described in the present disclosure, may also be used.

The glass may further include lithium oxide ($Li_2O$), sodium oxide ($Na_2O$), iron(III) oxide ($Fe_2O_3$), zinc oxide (ZnO), barium oxide (BaO), calcium oxide (CaO), boron trioxide ($B_2O_3$), tin (IV) oxide ($SnO_2$), or a combination thereof.

Iron(III) oxide ($Fe_2O_3$) may be included in an amount of 1 mol % to 3 mol %, for example, 1 mol % to 2.5 mol %, or 1 mol % to 2 mol %, based on the total amount of the glass. Zinc oxide (ZnO) may be included in an amount of 5 mol % to 10 mol %, for example, 6 mol % to 9 mol %, or 6.1 mol % to 6.6 mol %, based on the total amount of the glass. Lithium oxide ($Li_2O$) may be included in an amount of 6 mol % to 12 mol %, for example, 9.1 mol % to 12 mol %, based on the total amount of the glass. Sodium oxide ($Na_2O$) may be included in an amount of 3 mol % to 15 mol %, for example, 5.1 mol % to 13.1 mol %, based on the total amount of the glass. Barium oxide (BaO) may be included in an amount of 16 mol % to 26 mol %, for example, 19.2 mol % to 23.2 mol %, based on the total amount of the glass. Calcium oxide (CaO) may be included in an amount of 5 mol % to 12 mol %, for example, 6.1 mol % to 10.1 mol %, based on the total amount of the glass. Boron trioxide ($B_2O_3$) may be included in an amount of 15 mol % to 25 mol %, for example, 20.2 mol % to 23 mol %, based on the total amount of the glass. Tin (IV) oxide ($SnO_2$) may be included in an amount of 0.1 mol % to 3 mol %, for example, 1 mol % to 2 mol %, based on the total amount of the glass.

When the content of each of the above-mentioned components is within the above-mentioned range, the corrosion resistance and the moisture resistance can be further improved. The amounts of the components disclosed above may each be determined by scanning electron microscope-energy dispersive spectroscopy (SEM-EDS) analysis. Other methods and/or tools appreciated by one of ordinary skill in the art, even if not described in the present disclosure, may also be used.

The external electrodes 131 and 132 may further include conductive resin layers that are disposed on the above-mentioned outer layers 20 and 40 so as to cover the outer layers 20 and 40, and plating layers that are disposed so as to cover the conductive resin layers.

The conductive resin layers may extend to the first and second surfaces or fifth and sixth surfaces of the capacitor body 110, and the lengths of regions (i.e., band portions) where the conductive resin layers extend to the first and second surfaces or fifth and sixth surfaces of the capacitor body 110 may be longer than the lengths of regions (i.e., band portions) where the outer layers 20 and 40 extend to the first and second surfaces or fifth and sixth surfaces of the capacitor body 110. In other words, the conductive resin layers may be formed on the outer layers 20 and 40, and may be formed so as to completely cover the outer layers 20 and 40.

The conductive resin layers include a resin and a conductive metal.

The resin included in the conductive resin layers is not particularly limited as long as it has a bonding property and an impact absorption property and can be mixed with conductive metal powder to form a paste, and may include, for example, a phenolic resin, an acrylic resin, a silicon resin, an epoxy resin, or a polyimide resin.

The conductive metal included in the conductive resin layers serves to electrically couple the internal electrode layers 121 and 122 or the inner layers 10 and 30 to the outer layers 20 and 40.

The conductive metal included in the conductive resin layers may have a spherical shape, a flake shape, or a combination thereof. In other words, the conductive metal may be formed only in a flake shape, or may be formed only in a spherical shape, or may be the form of a mixture of a flake shape and a spherical shape.

Here, the spherical shape may include a shape which is not fully spherical, and may include, for example, a shape in which the ratio of the length of the long axis to the length of the short axis ([Long Axis]/[Short Axis]) is 1.45 or less. Flake-type powder may refer to powder having a flat, elongated shape, but is not particularly limited, and may be, for example, a shape in which the ratio of the length of the long axis to the length of the short axis ([Long Axis]/[Short Axis]) is 1.95 or greater.

The plating layers may include one of nickel (Ni), copper (Cu), tin (Sn), palladium (Pd), platinum (Pt), gold (Au), silver (Ag), tungsten (W), titanium (Ti), and lead (Pb), or an alloy thereof. For example, each plating layer may be a nickel (Ni) plating layer or a tin (Sn) plating layer, or may be a form in which a nickel (Ni) plating layer and a tin (Sn) plating layer are sequentially stacked, or may be a form in which a tin (Sn) plating layer, a nickel (Ni) plating layer, and a tin (Sn) plating layer are sequentially stacked. Alternatively, each plating layer may include a plurality of nickel (Ni) plating layers and/or a plurality of tin (Sn) plating layers.

The plating layers can improve the mounting characteristics of the multilayer ceramic capacitor 100 to a substrate, and the structural reliability, the resistance to the outside, the heat resistance, and equivalent series resistance (ESR) of the multilayer ceramic capacitor.

Dielectric Layers and Internal Electrode Layers

The dielectric layers 111 includes a barium-titanate-based major component.

The barium-titanate-based major component is a dielectric raw material, and has a high dielectric constant, and contributes to the formation of the dielectric constant of the multilayer ceramic capacitor 100.

The barium-titanate-based major component may include, for example, $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, or a combination thereof.

The dielectric layers 111 may further include a minor component. The minor component may include, for example, manganese (Mn), chromium (Cr), silicon (Si), aluminum (Al), magnesium (Mg), tin (Sn), antimony (Sb), germanium (Ge), gallium (Ga), indium (In), barium (Ba), lanthanum (La), yttrium (Y), actinium (Ac), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V), or a combination thereof.

The average thickness (the average length in the T-axis direction) of the dielectric layers 111 may be in a range from 2.0 μm to 8.0 μm, for example, a range from 2.4 μm to 7.8 μm. When the average thickness of the dielectric layers 111 is within the above-mentioned range, the reliability of the multilayer ceramic capacitor is excellent. The average thickness of a dielectric layer 111 may be obtained from a scanning electron microscope (SEM) image of a cross section sample obtained as described above by setting the center point of the dielectric layer in the length direction (L-axis direction) or the width direction (W-axis direction) as a reference point and calculates the arithmetic average of the thicknesses of the dielectric layer 111 at 10 points at predetermined intervals from the reference point. The intervals between the 10 points may be adjusted according to the scale of the SEM image, and may be, for example, an interval of 1 μm to 100 μm, 1 μm to 50 μm, or 1 μm to 10 μm. In this case, all 10 points should be located within the dielectric layers 111, and when all 10 points are not located within the dielectric layers 111, the position of the reference point may be changed or the interval of 10 points may be adjusted.

The internal electrode layers 121 and 122, i.e., the first internal electrode layer 121 and the second internal electrode layer 122 are electrodes with different polarities, and may be alternately disposed along the T-axis direction such that a first internal electrode layer and a second internal electrode layer adjacent to each other with a dielectric layer 111 interposed therebetween face each other, and one end of each internal electrode may be exposed from the third and fourth surfaces of the capacitor body 110.

The first internal electrode layers 121 and the second internal electrode layers 122 may be electrically insulated from each other by the dielectric layers 111 disposed therebetween.

The end portions of the first internal electrode layers 121 and the second internal electrode layers 122 that are alternately exposed from the third and fourth surfaces of the capacitor body 110 may be electrically coupled to the first external electrode 131 and the second external electrode 132, respectively.

The first internal electrode layers 121 and the second internal electrode layers 122 may include a conductive metal, and may include a metal such as Ni, Cu, Ag, Pd, Au, or the like, or an alloy thereof such as an Ag—Pd alloy.

Also, the first internal electrode layers 121 and the second internal electrode layers 122 may include dielectric particles of the same composition system as that of the ceramic material included in the dielectric layers 111.

The first internal electrode layers 121 and the second internal electrode layers 122 may be formed using conductive paste including a conductive metal. The printing method of the conductive paste may use a screen printing method or a gravure printing method.

The average thicknesses of the first internal electrode layers 121 and the second internal electrode layers 122 may be in a range from 0.1 μm to 2 μm. The average thicknesses of the first internal electrode layer 121 and the second internal electrode layer 122 may be measured by scanning electron microscope (SEM) analysis. Here, the scanning electron microscope (SEM) analysis is the same as the above-described method for measuring the average thicknesses of the dielectric layers 111, and thus a description thereof will not be made.

The capacitor body 110 may be formed by firing a laminate in which the plurality of dielectric layers 111 and the internal electrode layers 121 and 122 are stacked.

Hereinafter, a method of manufacturing the multilayer ceramic capacitor 100 according to an embodiment will be described.

Method of Manufacturing Multilayer Ceramic Capacitor

The above-described multilayer ceramic capacitor 100 may be manufactured by performing a step of forming a metal particle film on one surface of the capacitor body 110 including the dielectric layers 111 and the internal electrode layers 121 and 122 by applying and reducing metal-organic decomposition (MOD) ink, a step of applying paste to one surface of the capacitor body 110 with the metal particle film, and a step of forming the external electrodes 131 and 132 including the inner layers 10 and 30 and the outer layers 20 and 40 by sintering the paste. In this case, the paste includes the conductive metal and the glass, and the glass is a composition excellent in the corrosion resistance and includes aluminum oxide ($Al_2O_3$) and silicon dioxide ($SiO_2$). By sintering the paste, the external electrodes that include the inner layers formed from the metal particle film and the outer layers formed from the paste may be formed.

According to the manufacturing method, when the metal-organic decomposition (MOD) ink is applied and sintered to form the external electrodes, the metal particle film formed from the metal-organic decomposition (MOD) ink composed of small particles is sintered first, which hinders the glass in the paste from descending to the active portion of the capacitor body. Accordingly, the corrosion-resistant glass cannot spread under the internal electrode layers, and migrates out of the active portion of the capacitor body. Therefore, the contact property between the internal electrode layers and the external electrodes is significantly improved, and the manufactured multilayer ceramic capacitor can exhibit high capacitance.

First, a method of manufacturing the capacitor body 110 will be described.

The capacitor body 110 may be manufactured through a step of producing dielectric green sheets using dielectric slurry and forming conductive paste layers on the surfaces of the dielectric green sheet, a step of manufacturing a dielectric green sheet laminate by stacking the dielectric green sheets with the conductive paste layers, and a step of firing the dielectric green sheet laminate.

The dielectric slurry may be produced by mixing barium-titanate-based major component powder, and optionally minor component powder.

The barium-titanate-based major component powder is identical to the barium-titanate-based major component, which is included in the dielectric layers, and thus a description thereof will not be made here.

The minor component powder may include, for example, manganese (Mn), chromium (Cr), silicon (Si), aluminum (Al), magnesium (Mg), tin (Sn), antimony (Sb), germanium (Ge), gallium (Ga), indium (In), barium (Ba), lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V), or a combination thereof, but is not limited thereto. The powder of each minor component may be included in an amount of 0.01 mol to 5 mol based on 100 mol of the barium-titanate-based major component powder.

The minor component powder may be used in the form of an oxide or a salt compound containing each metal, or may be used in the form of a sol dispersed in an organic solvent.

Also, the dielectric slurry may be produced by additionally mixing additives such as a dispersant, a binder, a plasticizer, a lubricant, an antistatic agent, and the like, and the solvent.

The barium-titanate-based major component powder and optionally the minor component powder may be mixed using a wet ball mill or agitated mill. When zirconia balls are used in the wet ball mill, wet mixing may be performed using a number of zirconia balls with a diameter of 0.1 mm to 10 mm for 8 hours to 48 hours, or for 10 hours, or for 24 hours.

The produced dielectric slurry may be used to form the dielectric layers by firing.

As a method of forming the produced dielectric slurry into a sheet shape, a tape formation method, for example, a doctor blade method and a calender roll method, and the like may be used, and, for example, a head discharge type on-roll forming coater may be used, and thereafter, the formed bodies may be dried. As a result, dielectric green sheets may be obtained.

In order to form the conductive paste layers to be the internal electrode layers after firing, conductive paste may be produced by mixing conductive powder including a conductive metal or an alloy thereof, a binder, and a solvent. Further, if necessary, barium titanate powder may be mixed as a common material. The common material may serve to inhibit the sintering of the conductive powder during the firing process. The conductive paste is applied to the surfaces of the dielectric green sheets in a predetermined pattern by various printing or transfer methods such as screen printing, whereby conductive paste layers may be formed.

The conductive powder may include nickel (Ni) or a nickel (Ni) alloy.

Subsequently, a dielectric green sheet laminate is manufactured by stacking a plurality of dielectric green sheets with the internal electrode patterns and pressing them in the stacking direction. At this time, the dielectric green sheets and the internal electrode patterns may be stacked such that dielectric green sheets are disposed at the top and bottom in the stacking direction of the dielectric green sheet laminate.

A step of cutting the manufactured dielectric green sheet laminate into predetermined dimensions by dicing or the like may be selectively performed.

Further, if necessary, the dielectric green sheet laminate may be solidified and dried to remove the plasticizer and the like, and may be subjected to barrel polishing using a horizontal centrifugal barrel machine or the like after the solidification and drying. During the barrel polishing, the dielectric green sheet laminate may be put into a barrel container along with a media and a polishing solution, and rotational motion, vibration, or the like may be applied to the barrel container to polish unnecessary portions such as burrs like formed during the cutting. After the barrel polishing, the dielectric green sheet laminate may be washed with a cleaning solution such as water, and dried.

Subsequently, the dielectric green sheet laminate may be subjected to a de-bindering process and firing. In this way, the capacitor body is manufactured.

The de-bindering process conditions may be appropriately adjusted according to the components of the dielectric layers and the components of the internal electrode layers. For example, during the de-bindering process, the temperature rising rate may be 5° C./hr to 300° C./hr, the holding temperature may be 180° C. to 400° C., and the temperature holding time may be 0.5 hours to 24 hours. During the de-bindering process, the atmosphere may be air or a reducing atmosphere.

The conditions for the firing process may be appropriately adjusted according to the major component composition of the dielectric layers or the major component composition of the internal electrode layers. For example, the firing may be performed at a temperature of 1100° C. to 1400° C., for example, at a temperature of 1200° C. to 1350° C. Further, the firing may be performed for 0.5 hours to 8 hours, for example, for 1 hour to 3 hours. Furthermore, the firing may be performed in a reducing atmosphere, for example, in a humidified atmosphere of a mixed gas of nitrogen and hydrogen. When the internal electrode layers include nickel (Ni) or a nickel (Ni) alloy, the partial pressure of oxygen in the firing atmosphere may be in a range from $1.0\times10^{-14}$ MPa to $1.0\times10^{-10}$ MPa.

After the firing process, if necessary annealing may be performed. Annealing is a process for re-oxidizing the dielectric layers, and when the firing process has been performed at a reducing atmosphere, annealing may be performed. The conditions for the annealing process may be appropriately adjusted according to the components of the dielectric layers. For example, during the annealing, the temperature may be 950° C. to 1150° C., the time may be 0 hours to 20 hours, and the temperature rising rate may be 50° C./hr to 500° C./hr. The annealing atmosphere may be a humidified nitrogen gas ($N_2$) atmosphere, and the partial pressure of oxygen may be in a range from 10×10−9 MPa to $10\times10^{-5}$ MPa.

In the de-bindering process, the firing process, or the annealing process, for example, a wetter or the like may be used to humidify a nitrogen gas, a mixed gas, or the like, and in this case, the water temperature may be in a range from 5° C. to 75° C. The de-bindering process, the firing process, and the annealing process may be consecutively performed, or may be independently performed.

Selectively, surface treatments such as sandblasting treatment, laser irradiation, and barrel polishing may be performed on the third surface and fourth surface of the manufactured capacitor body 110. By performing these surface treatments, the end portions of the first internal electrode layers and the second internal electrode layers may be exposed from the outermost surfaces of the third surface and the fourth surface, which improves the electrical bonding between the first and second external electrodes and the first and second internal electrode layers and makes it easy for alloy portions to be formed.

Now, a method of manufacturing the external electrodes 131 and 132 will be described with reference to FIG. 5.

Figure 5:
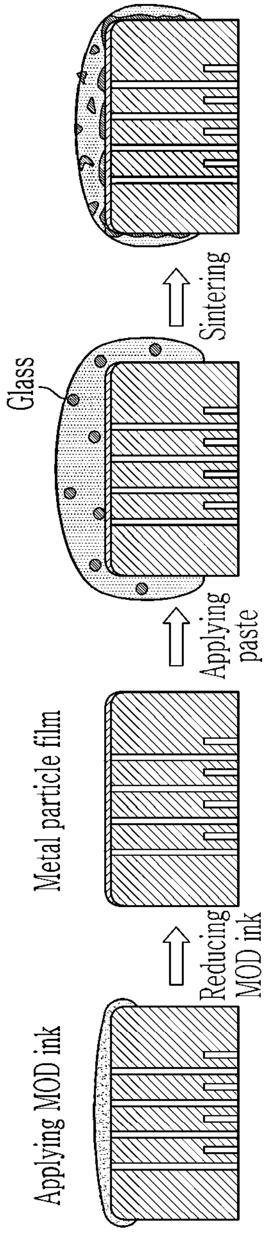
FIG. 5 is a schematic diagram illustrating a method of manufacturing the external electrodes of the multilayer ceramic capacitor according to the embodiment.

FIG. 5 is a schematic diagram illustrating a method of manufacturing the external electrodes of the multilayer ceramic capacitor according to the embodiment.

Referring to FIG. 5, the metal-organic decomposition (MOD) ink is applied to one surface of the manufactured capacitor body 110 and is reduced, whereby a metal particle film is formed.

The metal-organic decomposition (MOD) ink may be applied to at least of the third surface and fourth surface of the capacitor body 110, and may also be optionally applied to some portions of the first surface, the second surface, the fifth surface, or the sixth surface where the band portions of the first external electrode and the second external electrode are formed.

The metal-organic decomposition (MOD) ink may include conductive metal formate formed by the reaction of a conductive metal precursor and formic acid, an amine compound, a binder, and a solvent.

The conductive metal precursor may be a precursor containing a conductive metal including copper (Cu), nickel (Ni), silver (Ag), palladium (Pd), gold (Au), platinum (Pt), tin (Sn), tungsten (W), titanium (Ti), lead (Pb), an alloy thereof, or a combination thereof. Examples of the conductive metal precursor include metal oxides, metal hydroxides, metal nitrates, metal carbonates, metal sulfates, metal chlorides, metal acetates, or combinations thereof.

The conductive metal formate may be included in an amount of 35 wt % to 45 wt % based on the total amount of the metal-organic decomposition (MOD) ink.

Examples of the amine compound include butylamine, hexylamine, octylamine, dibutylamine, triethylamine, diethylenetriamine, ethylenediamine, cyclohexylamine, aminomethylpropanol, or combinations thereof.

The amine compound may be included in an amount of 30 wt % to 50 wt % based on the total amount of the metal-organic decomposition (MOD) ink.

The binder may include a thermoplastic resin, a thermosetting resin, a natural polymer, or a combination thereof. Examples of the thermoplastic resin include acryl-based resins, cellulose-based resins, aliphatic or copolymer polyester-based resins, vinyl-based resins, polyamide resins, polyurethane resins, polyether resins, urea resins, alkyd resins, silicon resins, fluorine resins, olefin-based resins, and the like. Examples of the acryl-based resins may include polyacrylic acid, polyacrylic acid ester, and the like. Examples of the thermosetting resins include epoxy-based resins, unsaturated or vinyl polyester-based resins, diallylphthalate-based resins, phenol-based resins, oxetane-based resins, oxazine-based resins, bismaleimide-based resins, modified-silicon-based resins, melamine-based resins, and the like. Examples of the natural polymer include ethylene-propylene rubber (EPR), styrene-butadiene rubber (SBR), starch, gelatin, and the like.

The binder may be included in an amount of 0.1 wt % to 5 wt %, for example, 0.1 wt % to 1 wt % based on 100 parts by weight of the conductive metal precursor.

The solvent may include water; an alcohol-based solvent such as methanol, ethanol, isopropanol, 1-methoxypropanol, butanol, ethylhexyl alcohol, or terpineol; a glycol-based solvent such as ethylene glycol or glycerin; an acetate-based solvent such as ethyl acetate, butyl acetate, methoxypropyl acetate, carbitol acetate, or ethyl carbitol acetate; an ether-based solvent such as methyl cellosolve, butyl cellosolve, diethyl ether, tetrahydrofuran, or dioxane; a ketone-based solvent such as methylethylketone, acetone, dimethylformamide, or 1-methyl-2-pyrrolidone; a hydrocarbon-based solvent such as hexane, heptane, dodecane, a paraffin oil, or a mineral spirit; an aromatic solvent such as benzene, toluene, or xylene; a halogen-substituted solvent such as chloroform, methylene chloride, or carbon tetrachloride; or a combination thereof.

The solvent may be included in the residual content excluding the above-mentioned components with respect to the total amount of the metal-organic decomposition (MOD) ink.

The metal-organic decomposition (MOD) ink may be applied to a thickness of 50 μm to 400 μm, for example, in a thickness of 80 μm to 350 μm. If the metal-organic decomposition (MOD) ink is applied to a thickness within the above-mentioned range, the inner layers are formed of the metal-organic decomposition (MOD) ink to an appropriate thickness by sintering. Therefore, even if the corrosion-resistant glass is applied to the external electrodes, it is possible to implement high capacitance.

The reducing may be performed in a nitrogen atmosphere, and may be performed at a temperature of 170° C. to 300° C., for example, a temperature of 180° C. to 250° C., for 30 minutes to 3 hours, for example, for 40 minutes to 2 hours. When the reduction is performed under the conditions within the above-mentioned ranges, the inner layers are formed. Accordingly, even if the corrosion-resistant glass is applied, it is possible to obtain the external electrodes excellent in the contact property with respect to the internal electrode layers.

By applying the metal-organic decomposition (MOD) ink to one surface of the capacitor body 110 and reducing the metal-organic decomposition (MOD) ink, a metal particle film including very small and uniform metal nanoparticles may be formed. As an example, the metal particle film may include metal nanoparticles with an average size of 20 nm to 200 nm, for example, metal nanoparticles with an average size of 50 nm to 150 nm. The average size of the metal nanoparticles may be determined by scanning electron microscopy. Other methods and/or tools appreciated by one of ordinary skill in the art, even if not described in the present disclosure, may also be used.

Subsequently, paste is applied to one surface of the capacitor body 110 with the metal particle film and sintered.

The paste includes a conductive metal and glass.

The paste may include 85 wt % to 90 wt % of the conductive metal and 10 wt % to 15 wt % of the glass.

The conductive metal and the glass are the same as described above, so a description thereof will not be made here.

The paste may further include a binder, a solvent, a dispersing agent, a plasticizer, oxide powder, and the like.

As the binder, for example, ethylcellulose, acryl, butyral, or the like may be used, and as the solvent, an organic solvent such as terpineol, butylcarbitol, alcohol, methylethylketone, acetone, or toluene, or an aqueous solvent may be used.

As a method of applying the paste to one surface of the capacitor body 110, a dip method, various printing methods such as screen printing, application methods using a dispenser or the like, a spraying method using a spray, and the like may be used. The paste may be applied to at least of the third surface and fourth surface of the capacitor body 110, and may also be optionally applied to some portions of the first surface, the second surface, the fifth surface, or the sixth surface where the band portions of the first external electrode and the second external electrode are formed.

The sintering may be performed at a temperature of 700° C. to 800° C., for example, a temperature of 720° C. to 740° C., for 0.5 hours to 3 hours, for example, for 1 hour to 2 hours.

Selectively, conductive resin layers may be formed on the outer surfaces of the capacitor body 110 with the outer layers 20 and 40 formed on the inner layers 10 and 30, by applying the paste for forming the conductive resin layers and curing the paste.

The paste for forming the conductive resin layers may include a resin, and optionally a conductive metal or a non-conductive filler. The conductive metal and the resin are the same as described above, so a redundant description thereof will not be made. Further, the paste for forming the conductive resin layers may optionally include a binder, a solvent, a dispersing agent, a plasticizer, oxide powder, and the like. As the binder, for example, ethylcellulose, acryl, butyral, or the like may be used, and as the solvent, an organic solvent such as terpineol, butylcarbitol, alcohol, methylethylketone, acetone, or toluene, or an aqueous solvent may be used.

As an example, the conductive resin layers may be formed by dipping the capacitor body 110 in the paste for forming the conductive resin layers and curing the paste, by performing screen printing, gravure printing, or the like on the surface of the capacitor body 110 with the paste for forming the conductive resin layers, or by applying the paste for forming the conductive resin layers to the surface of the capacitor body 110 and curing the paste.

Next, plating layers may be formed on the outer sides of the conductive resin layers.

For example, the plating layers may be formed by a plating method, or may also be formed by sputtering or electric deposition.

Hereinafter, the above-mentioned embodiment will be described in more detail through the following examples. However, the following examples are merely for illustrative purposes, and do not limit the scope of rights.

(Manufacturing of Multilayer Ceramic Capacitor)

Example 1

Dielectric green sheet laminates were manufactured by manufacturing dielectric green sheets using barium titanate ($BaTiO_3$) major component powder, printing conductive paste layers including nickel (Ni) on the surfaces of the dielectric green sheets, and stacking and pressing the dielectric green sheets (whose width, length, and height are 3.2 mm, 2.5 mm, and 2.5 mm, respectively) with the conductive paste layers. The dielectric green sheet laminates were subjected to a calcination process in a nitrogen atmosphere at a temperature of 400° C. or lower, and were fired at a firing temperature at a firing temperature of 1300° C. or lower and at a hydrogen ($H_2$) concentration of 1.0% or less, whereby capacitor body were manufactured.

On one surface of each capacitor body, a Cu particle film consisting of Cu nanoparticles with an average size of 100 nm was formed by applying the metal-organic decomposition (MOD) ink including 40 wt % Cu formate, 45 wt % of octylamine, 0.5 wt % of acrylic resin (SPB 80), and the residual amount of water, to 100 μm, and reducing the metal-organic decomposition (MOD) ink in a nitrogen atmosphere at 200° C. for 1 hour.

Paste including 90 wt % of copper (Cu) and 10 wt % of glass was applied to one surface of each capacitor body with the Cu particle film, and was sintered at 730° C. for 70 minutes, whereby the external electrodes were formed. In this case, the glass includes 9.1 mol % of lithium oxide ($Li_2O$), 10 mol % of sodium oxide ($Na_2O$), 1.5 mol % of iron(III) oxide ($Fe_2O_3$), 6.3 mol % of zinc oxide (ZnO), 21 mol % of barium oxide (BaO), 11 mol % of silicon dioxide ($SiO_2$), 8 mol % of calcium oxide (CaO), 12 mol % of aluminum oxide ($Al_2O_3$), 20.2 mol % of boron trioxide ($B_2O_3$), and 1 mol % of tin (IV) oxide ($SnO_2$).

Subsequently, through a process such as plating, multilayer ceramic capacitors were manufactured.

Example 2

Multilayer ceramic capacitor were manufactured by a method identical to that in Example 1 except that Cu particle films were formed by applying the metal-organic decomposition (MOD) ink to 150 μm.

Example 3

Multilayer ceramic capacitors were manufactured by a method identical to that in Example 1 except that Cu particle films were formed by applying the metal-organic decomposition (MOD) ink to 200 μm.

Comparative Example 1

Multilayer ceramic capacitors were manufactured by a method identical to that in Example 1 except that external electrodes were formed on one surface of each capacitor body without forming a Cu particle film.

In other words, the paste including 90 wt % of Cu and 10% of the glass was applied to one surface of each capacitor body manufactured in the same way as that in Example 1, and was sintered at 730° C. for 70 minutes, whereby the external electrodes were formed.

Evaluation 1: SEM Analysis (1) Scanning electron microscope (SEM) analysis was performed on the multilayer ceramic capacitors manufactured in Example 1, and the result is shown in FIGS. 6A to 6C.

The SEM analysis was performed as follows. Cross section samples having surfaces along the L-axis direction and the T-axis direction (hereinafter, referred to as LT surfaces) were obtained such that the external electrodes could be observed, by loading the multilayer ceramic capacitors 100 manufactured in Example 1 on a tape such that their LT surfaces face up, putting them in an epoxy mixture, curing it, and polishing the LT surfaces of the capacitor body 110 half way in the W-axis direction. Subsequently, SEM images of the obtained cross section samples were obtained with a scanning electron microscope (SEM) such that the entire portions of each capacitor body and the external electrode disposed on one side could be shown and the center and corner portions of the external electrode could be shown. The SEM images were obtained at 20 kV and 0.2 nA with a TESCAN Vega3.

Figure 6A:
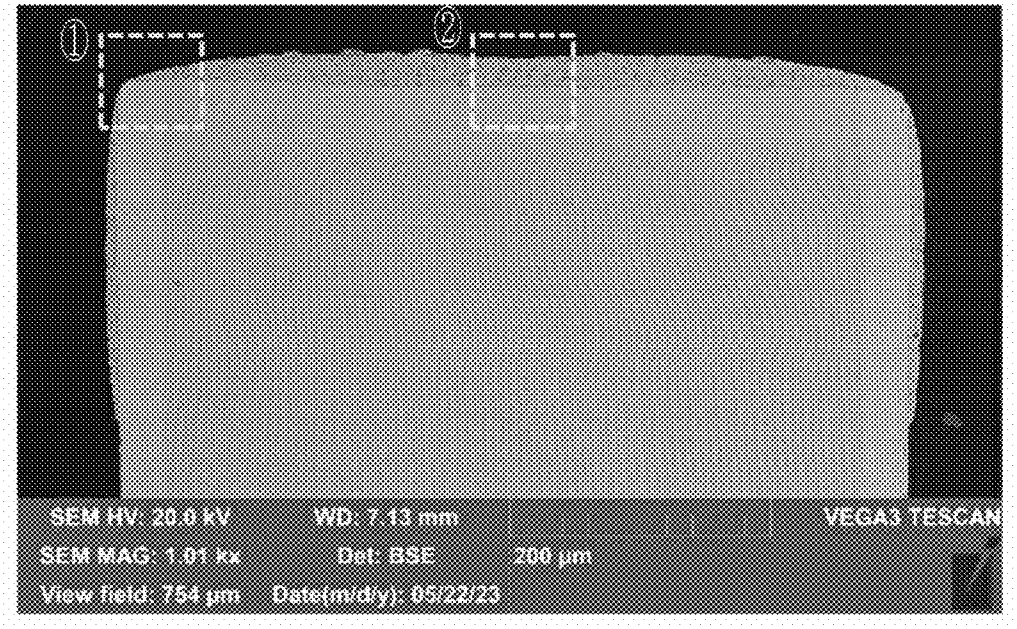
FIG. 6A is a SEM analysis image of an external electrode of a multilayer ceramic capacitor according to Example 1.
Figure 6B:
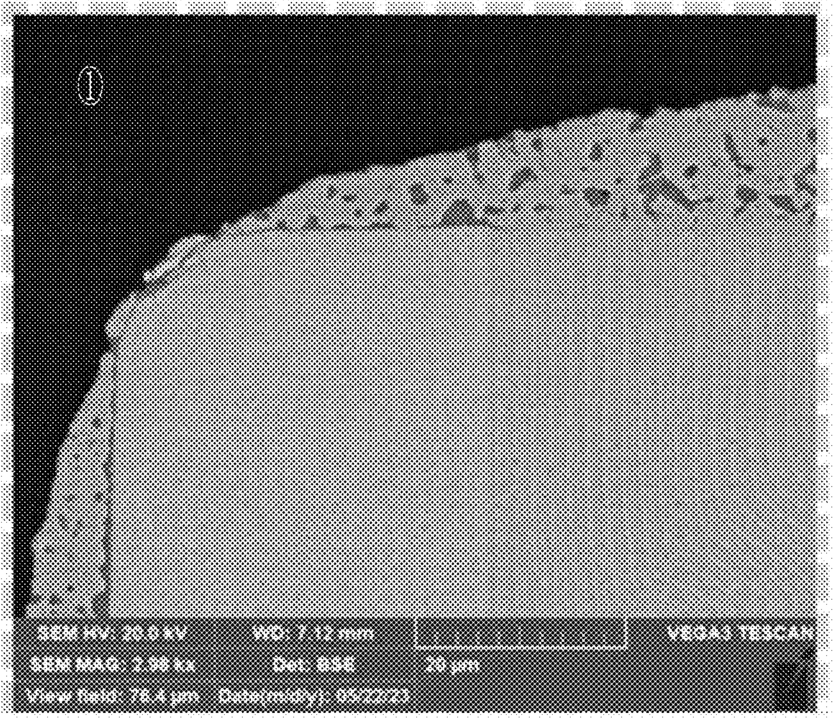
FIG. 6B is an enlarged SEM image of Part 1 of FIG. 6A.
Figure 6C:
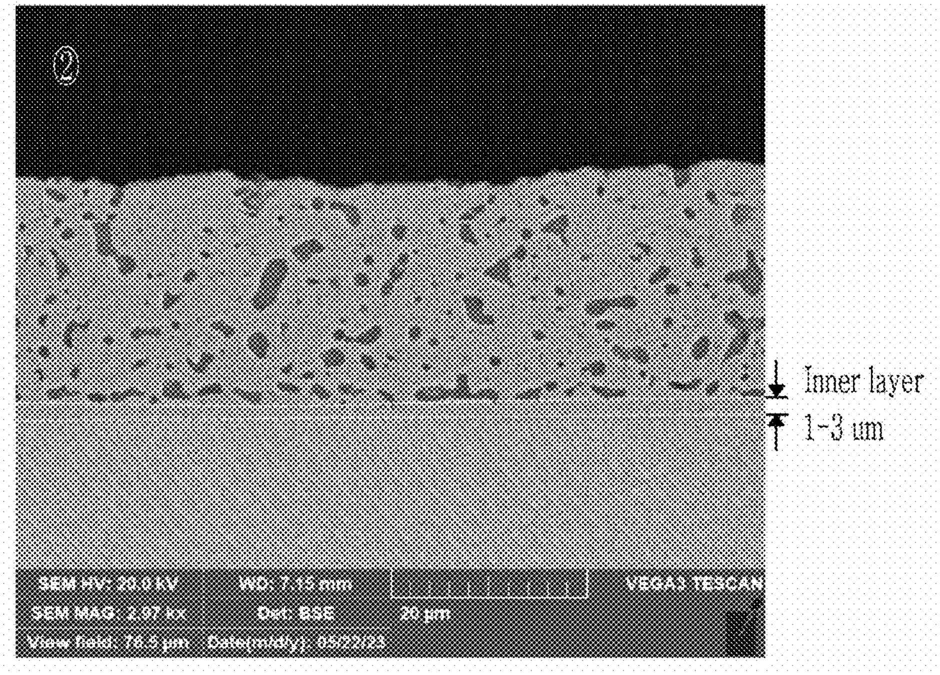
FIG. 6C is an enlarged SEM image of Part 2 of FIG. 6A.

FIG. 6A is a SEM analysis image of an external electrode of a multilayer ceramic capacitor according to Example 1, FIG. 6B is an enlarged SEM image of Part ① of FIG. 6A, and FIG. 6C is an enlarged SEM image of Part ② of FIG. 6A.

Referring to FIGS. 6A to 6C, it can be seen that the external electrodes manufactured according to Example 1 include inner layers formed from the Cu particle film on the active portion of the capacitor body, and outer layers formed on the inner layers and cover portions so as to cover the inner layers.

Also, it can be seen that the glass component of the outer layers is spread on the inner layers, i.e., on points spaced apart from the active portion by predetermined intervals. In other words, it can be seen that a large amount of glass component is present in the interface regions of the outer layers, i.e., the interface regions R1 defined as the regions from the boundaries between the inner layers and the outer layers to the points within ranges from 5% to 15% of the total thicknesses of the external electrodes. From this, it can be seen that as the inner layers are formed on the active portion, the glass component of the outer layers is prevented from spreading near the active portion, thereby improve the contact property with respect to the internal electrode layers, and accordingly, it is possible to implement high capacitance.

From the obtained SEM images of the cross section samples, the thicknesses of the inner layers 10 and 30 disposed between the active portion A of the capacitor body 110 and the outer layers 20 and 40 of the external electrodes 131 and 132 were measured. The thickness of each of the inner layers 10 and 30 was obtained by setting the center point of the corresponding inner layer 10 or 30 in the width direction (W-axis direction) as a reference point and calculating the arithmetic average of the thicknesses of the corresponding inner layer at 10 points at predetermined intervals from the reference point.

Referring to FIG. 6C, it can be seen that the inner layers in the external electrodes manufactured in Example 1 have a thickness of 1 μm to 3 μm.

Figure 7:
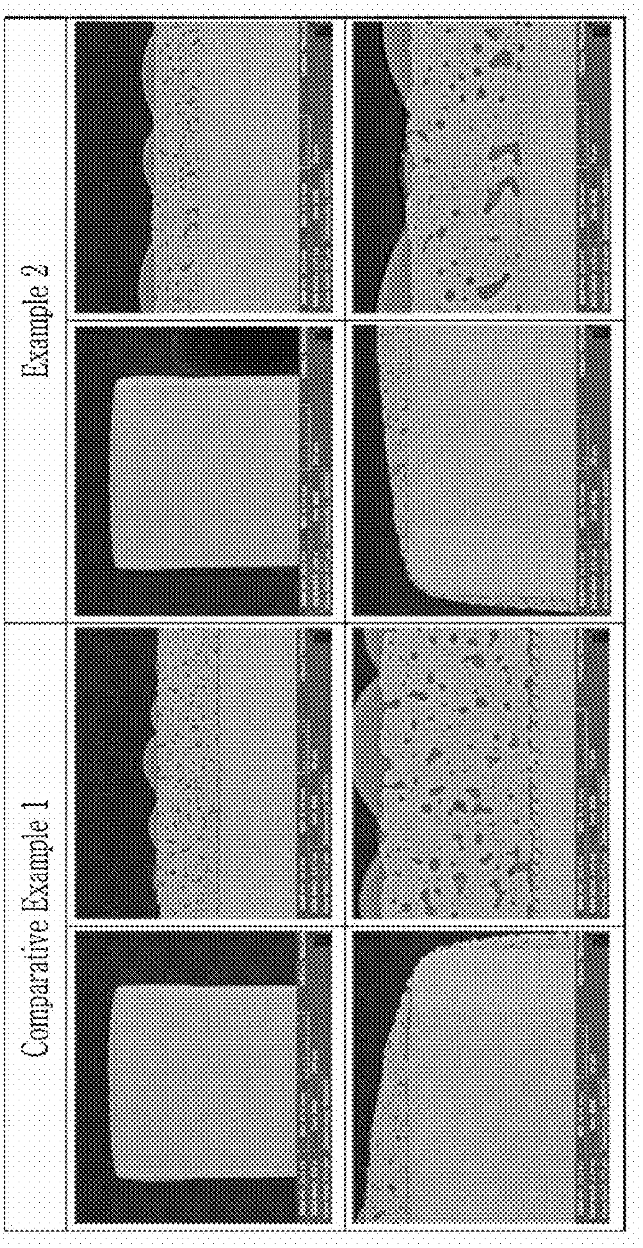
FIG. 7 is SEM analysis images of external electrodes of multilayer ceramic capacitors according to Example 2 and Comparative Example 1.

(2) Scanning electron microscope (SEM) analysis was performed on the multilayer ceramic capacitors manufactured in Example 2 and Comparative Example 1, and the results are shown in FIG. 7.

Cross section samples were obtained using the multilayer ceramic capacitors manufactured in Example 2 and Comparative Example 1 by the same method as described above, and SEM images of the cross section samples were obtained with a scanning electron microscope (SEM) such that the entire portions of the capacitor body and the external electrode disposed on one side could be shown and the center and corner portions of the external electrode could be shown. The SEM images were obtained at 20 kV and 0.2 nA with a TESCAN Vega3.

FIG. 7 is SEM analysis images of the external electrodes of the multilayer ceramic capacitors according to Example 2 and Comparative Example 1.

Referring to FIG. 7, it can be seen that the external electrodes manufactured according to Example 2 include inner layers formed on the active portions of the capacitor body, and outer layers formed on the inner layers and the cover portions so as to cover the inner layers. Also, it can be seen that a large amount of the glass component of the outer layers is present in the points spaced apart from the active portions by predetermined intervals, i.e., the interface regions R1 of the outer layers.

In contrast, it can be seen that the external electrodes manufactured according to Comparative Example 1 do not include inner layers, and thus the glass component is spread near the active portions. This is because the glass in the paste migrated out of the ceramic block or the external electrodes due to its low wettability with respect to Cu, and was spread near the active portions, particularly, the internal electrode layers. This eventually leads to a decrease in the capacitance.

Evaluation 2: SEM-EDS Analysis

Figure 8:
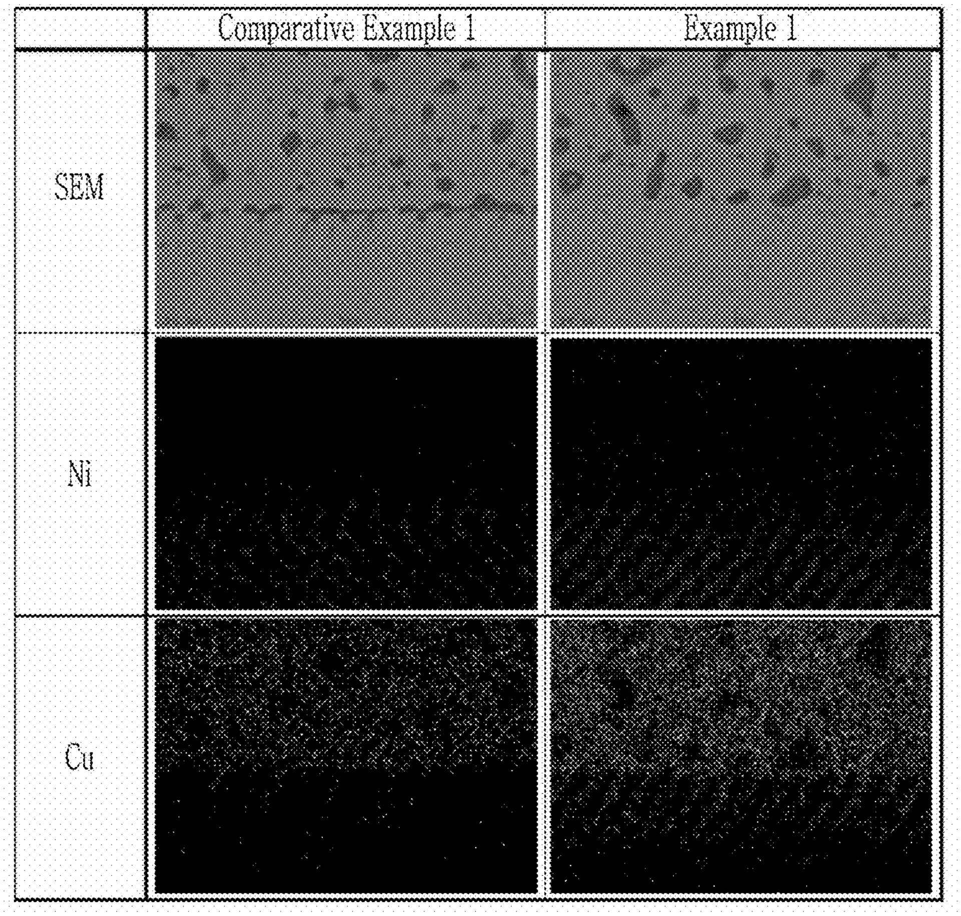
FIG. 8 is SEM-EDS analysis images of the external electrodes of the multilayer ceramic capacitors according to Example 1 and Comparative Example 1.

Scanning electron microscope-energy dispersive spectroscopy (SEM-EDS) analysis was performed on the multilayer ceramic capacitors manufactured in Example 1 and Comparative Example 1, and the results are shown in FIG. 8.

By performing energy dispersive spectroscopy (EDS) analysis on the SEM images of the cross section samples obtained in Evaluation 1, the contents of individual components in the inner layers and outer layers of the external electrodes and the internal electrode layers of the active portions were checked.

FIG. 8 is SEM-EDS analysis images of the external electrodes of the multilayer ceramic capacitors according to Example 1 and Comparative Example 1.

Referring to FIG. 8, it can be seen that the inner layers of the external electrodes according to Example 1 include 95 atom % or more of Cu. Also, it can be seen that due to enhancement in the contact property of the external electrodes of Example 1 with respect to the internal electrode layers, Cu in the inner layers of the external electrodes diffused well into the internal electrode layers and Ni in the internal electrode layers diffused well into the inner layers of the external electrodes, whereby a Cu—Ni alloy was formed. In contrast, it can be seen that in Comparative Example 1, the glass was spread near the active portion, which hindered the formation of a Cu—Ni alloy.

Evaluation 3: Capacitance

Figure 9:
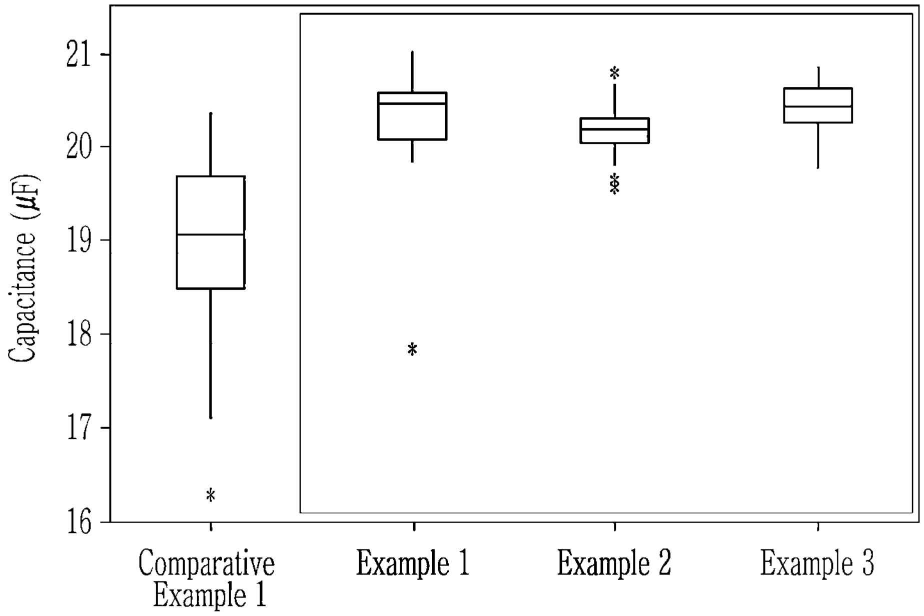
FIG. 9 is a graph illustrating the capacitance of multilayer ceramic capacitors according to Examples 1 to 3 and Comparative Example 1.

The capacitance of the multilayer ceramic capacitors manufactured in Examples 1 to 3 and Comparative Example 1 was measured at 120 Hz and 0.5 V, and the results are shown in FIG. 9.

FIG. 9 is a graph illustrating the capacitance of the multilayer ceramic capacitors according to Examples 1 to 3 and Comparative Example 1.

Referring to FIG. 9, it can be seen that Examples 1 to 3 in which according to the embodiment, the Cu particle films were formed and then the paste using the corrosion-resistant glass was applied have high capacitance. In contrast, it can be seen that in Comparative Example 1 using the corrosion-resistant glass without forming a Cu particle film, the capacitance distribution is very wide and the capacitance is low.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A multilayer ceramic capacitor comprising:

a capacitor body that includes dielectric layers and internal electrode layers, the capacitor body comprising (i) an active portion in which the dielectric layers and the internal electrode layers are alternately disposed, and (ii) a cover portion in which the dielectric layers are disposed on surfaces of the active portion opposing each other in a thickness direction; and external electrodes that are disposed on an outside of the capacitor body, each of the external electrodes including (i) an inner layer that is disposed on the active portion on a cross-section of the capacitor body so as to be electrically coupled to at least one of the internal electrode layers, and (ii) an outer layer that is disposed on the inner layer and the cover portion so as to cover the inner layer, the inner layer including a conductive metal in an amount of 95 atom % to 100 atom % based on a total amount of elements in the inner layer, and the outer layer including the conductive metal, and glass including aluminum oxide ($Al_2O_3$) and silicon dioxide ($SiO_2$), wherein a thickness of the inner layer is in a range of from 1 μm to 3 μm, the outer layer includes an interface region R1 defined as a region from a boundary between the inner layer and the outer layer to a point in a range of from 5% to 15% of a total thickness of the external electrodes in a length direction (L-axis direction), and the glass of the outer layer is included in the interface region R1 in an amount of 50 mol % to 100 mol % based on a total amount of the glass of the outer layer.

2. The multilayer ceramic capacitor of claim 1, wherein the conductive metal that is included in the inner layer and the outer layer comprises copper (Cu), nickel (Ni), silver (Ag), palladium (Pd), gold (Au), platinum (Pt), tin (Sn), tungsten (W), titanium (Ti), lead (Pb), an alloy thereof, or a combination thereof.

3. The multilayer ceramic capacitor of claim 1, wherein the conductive metal that is included in the inner layer and the outer layer comprises nanoparticles with an average size of 20 nm to 200 nm.

4. The multilayer ceramic capacitor of claim 1, wherein the inner layer further comprises the glass including aluminum oxide ($Al_2O_3$) and silicon dioxide ($SiO_2$), and the glass of the inner layer is included in an amount of 0.1 mol % to 5 mol % based on a total amount of components of the inner layer.

5. The multilayer ceramic capacitor of claim 1, wherein the outer layer includes an interface region R2 defined as a region from a boundary between the cover portion and the outer layer to a point in a range of from 5% to 15% of a total thickness of the external electrodes along a longest curvature radii of the external electrodes, and the glass of the outer layer is included in the interface region R2 in an amount of 70 mol % to 100 mol % based on a total amount of the glass of the outer layer.

6. The multilayer ceramic capacitor of claim 1, wherein at least one of the inner layer and the internal electrode layers includes a Cu—Ni alloy.

7. The multilayer ceramic capacitor of claim 1, wherein the aluminum oxide ($Al_2O_3$) is included in an amount of 10 mol % to 20 mol % based on a total amount of the glass of the outer layer.

8. The multilayer ceramic capacitor of claim 1, wherein the silicon dioxide ($SiO_2$) is included in an amount of 8 mol % to 15 mol % based on a total amount of the glass of the outer layer.

9. The multilayer ceramic capacitor of claim 1, wherein the glass of the outer layer further includes lithium oxide ($Li_2O$), sodium oxide ($Na_2O$), iron(III) oxide ($Fe_2O_3$), zinc oxide (ZnO), barium oxide (BaO), calcium oxide (CaO), boron trioxide ($B_2O_3$), tin (IV) oxide ($SnO_2$), or a combination thereof.

10. The multilayer ceramic capacitor of claim 1, wherein the glass of the outer layer further includes iron(III) oxide ($Fe_2O_3$) and zinc oxide (ZnO), iron(III) oxide ($Fe_2O_3$) is included in an amount of 1 mol % to 3 mol % based on a total amount of the glass of the outer layer, and zinc oxide (ZnO) is included in an amount of 5 mol % to 10 mol % based on a total amount of the glass of the outer layer.

11. A method of manufacturing the multilayer ceramic capacitor of claim 1, the method comprising:

forming a metal particle film by applying metal-organic decomposition (MOD) ink to one surface of the capacitor body and reducing the metal-organic decomposition (MOD) ink;

applying a paste including the conductive metal and the glass to one surface of the capacitor body on which the metal particle film is formed; and sintering the paste to form the external electrodes, each of the external electrodes includes the inner layer, which is formed from the metal particle film, and the outer layer, which is formed from the paste.

12. The method of manufacturing the multilayer ceramic capacitor according to claim 11, wherein the metal-organic decomposition (MOD) ink includes a conductive metal formate, an amine compound, a binder, and a solvent.

13. The method of manufacturing the multilayer ceramic capacitor according to claim 11, wherein the metal-organic decomposition (MOD) ink is applied to a thickness of 50 μm to 400 μm.

14. The method of manufacturing the multilayer ceramic capacitor according to claim 11, wherein the reducing is performed at a temperature of 170° C. to 300° C. for 30 minutes to 3 hours.

15. The method of manufacturing the multilayer ceramic capacitor according to claim 11, wherein the metal particle film includes metal nanoparticles with an average size of 20 nm to 200 nm.

16. The method of manufacturing the multilayer ceramic capacitor according to claim 11, wherein the aluminum oxide ($Al_2O_3$) is included in an amount of 10 mol % to 20 mol % based on a total amount of the glass included in the paste.

17. The method of manufacturing the multilayer ceramic capacitor according to claim 11, wherein the silicon dioxide ($SiO_2$) is included in an amount of 8 mol % to 15 mol % based on a total amount of the glass included in the paste.

18. The method of manufacturing the multilayer ceramic capacitor according to claim 11, wherein the metal particle film consists of metal nanoparticles with an average size of 20 nm to 200 nm.

19. The method of manufacturing the multilayer ceramic capacitor according to claim 11, wherein the metal-organic decomposition (MOD) ink includes copper formate, octylamine, acrylic resin, and water.

20. A multilayer ceramic capacitor comprising:

a capacitor body that includes dielectric layers and internal electrode layers, the capacitor body including (i) an active portion in which the dielectric layers and the internal electrode layers are alternately disposed, and (ii) a cover portion in which the dielectric layers is disposed on surfaces of the active portion opposing each other in a thickness direction; and external electrodes that are disposed on an outside of the capacitor body, each of the external electrodes including (i) an inner layer that is disposed on the active portion on a cross-section of the capacitor body so as to be electrically coupled to at least one of the internal electrode layers, and (ii) an outer layer that is disposed on the inner layer and the cover portion so as to cover the inner layer, the inner layer including a conductive metal in an amount of 95 atom % to 100 atom % based on a total amount of elements in the inner layer, the outer layer including the conductive metal, and glass including aluminum oxide ($Al_2O_3$) and silicon dioxide ($SiO_2$), the outer layer comprising an interface region R1 defined as a region from a boundary between the inner layer and the outer layer to a point in a range of from 5% to 15% of a total thickness of the external electrodes in a length direction, and the glass is included in the interface region R1 in an amount of 50 mol % to 100 mol % based on a total amount of the glass of the outer layer.

21. The multilayer ceramic capacitor of claim 20, wherein a thickness of the inner layer is in a range of from 1 μm to 3 μm, and the conductive metal that is included in the inner layer and the outer layer comprises nanoparticles with an average size of 20 nm to 200 nm.

* * * * *